United States Patent [19]

Marchis et al.

[11] Patent Number: 5,543,821

[45] Date of Patent: Aug. 6, 1996

[54] TRACK BALL MOUNTED ON KEYBOARD

[75] Inventors: Carlos Marchis; David N. McVicar, both of Fremont; Robert L. Lathrop, San Jose, all of Calif.

[73] Assignee: Logitech, Inc., Fremont, Calif.

[21] Appl. No.: 277,696

[22] Filed: Jul. 20, 1994

Related U.S. Application Data

[63] Continuation of Ser. No. 859,271, Mar. 25, 1992, abandoned, which is a continuation-in-part of Ser. No. 681,210, Apr. 5, 1991, abandoned.

[51] Int. Cl.$^6$ ........................................................ G09G 5/08
[52] U.S. Cl. ............................................ 345/167; 345/157
[58] Field of Search ................................ 340/706, 709, 340/710; 400/70, 83, 717; 248/918; 250/231.14, 231.16, 237; 345/157, 158, 160, 163, 164, 165, 166, 167

[56] References Cited

U.S. PATENT DOCUMENTS

| | | |
|---|---|---|
| D. 315,552 | 3/1991 | Sacherman . |
| 3,757,128 | 9/1973 | Vermeulen . |
| 3,990,565 | 11/1976 | Felton et al. ........................... 400/70 |
| 4,533,830 | 8/1985 | Beauprey . |
| 4,654,525 | 3/1987 | Ebina et al. . |
| 4,670,743 | 6/1987 | Zemke ................................... 345/157 |
| 4,705,943 | 11/1987 | Charlton . |
| 4,913,387 | 4/1990 | Tice . |
| 4,939,508 | 7/1990 | Lawrence et al. . |
| 4,952,919 | 8/1990 | Nippoldt . |
| 4,977,397 | 12/1990 | Kuo et al. ............................. 340/710 |
| 5,008,528 | 4/1991 | Duchon . |
| 5,017,776 | 5/1991 | Loewen . |
| 5,027,109 | 6/1991 | Donovan et al. ..................... 340/710 |
| 5,144,290 | 9/1992 | Honda et al. ......................... 340/711 |
| 5,187,468 | 2/1993 | Garthwaite et al. ................. 340/710 |
| 5,281,958 | 1/1994 | Ashmun et al. ...................... 345/157 |

OTHER PUBLICATIONS

PC Magazine, Oct. 15, 1991, "Portable Pointing Device" by Bill Howard.
PC Magazine, Sep. 11, 1990, "Switchboard".
The Computer Glossary (4th Ed. Copyright 1989)., Picture of "Turbo Mouse".

*Primary Examiner*—Tommy P. Chin
*Assistant Examiner*—Gin Goon
*Attorney, Agent, or Firm*—Townsend and Townsend and Crew

[57] ABSTRACT

An improved track ball which can be conveniently manipulated with a single hand is disclosed. The track ball protrudes through a circular opening in a housing, with the top edge of the housing having a rounded switch. The switch can thus be manipulated with the fingers while the palm or thumb of the hand is manipulating the track ball. The housing is mounted at an angle to the side of a computer keyboard, providing for easy access. The track ball housing can be rotated to any continuous angle through two angles of rotation by the user. A tetrahedron support arrangement holds the ball in place at any angle. The same housing can be used for either the right or left sides of a keyboard by simply switching the activating point on the switch. An encoder wheel is attached by a shaft to the ball and has a number of slots extending from its center to its edge. The slots are rectangular in shape, and do not have edges along radial lines as in the prior art encoder wheels.

4 Claims, 14 Drawing Sheets

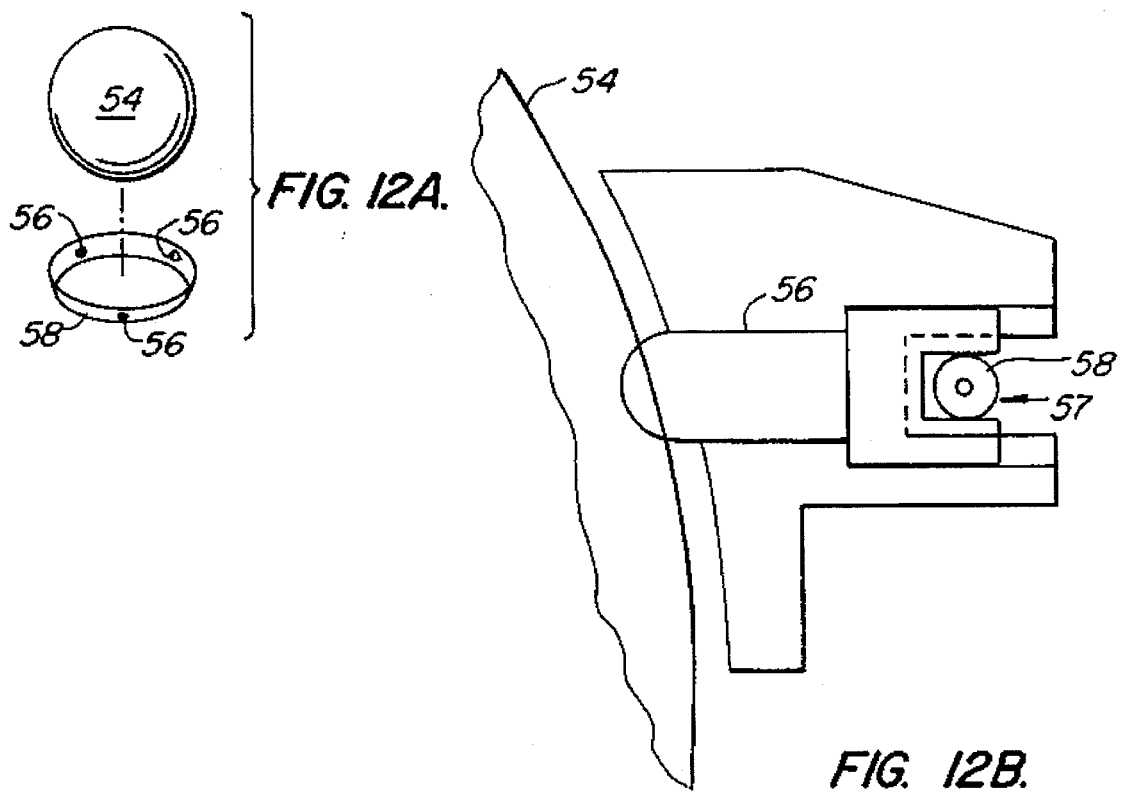
FIG. 12A.
FIG. 12B.
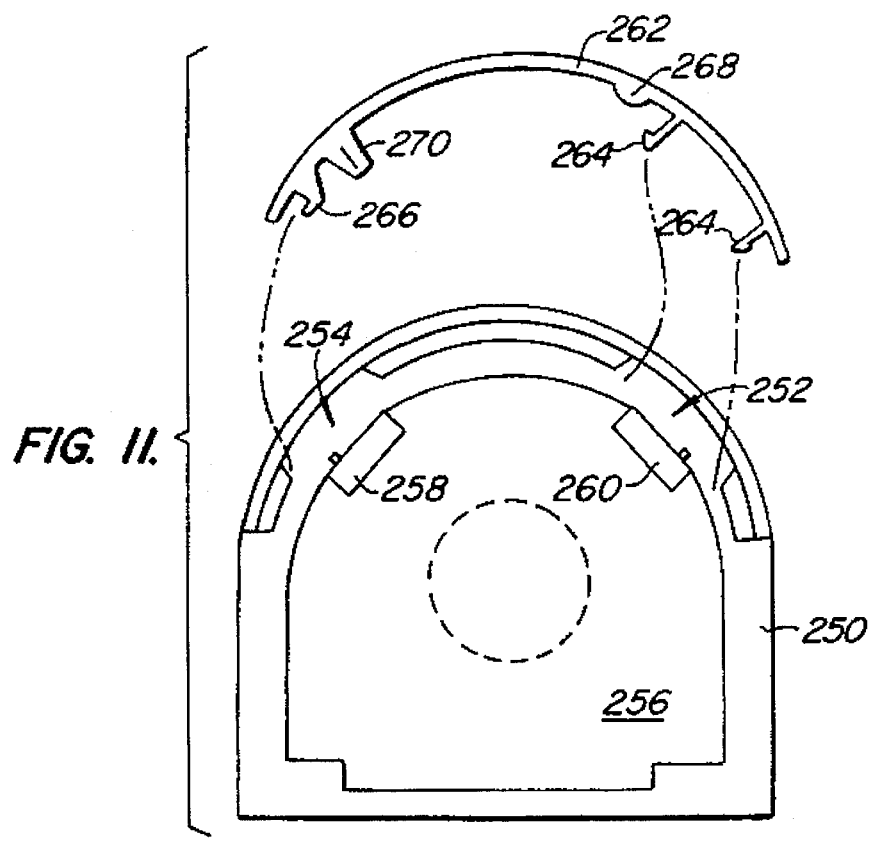
FIG. 11.

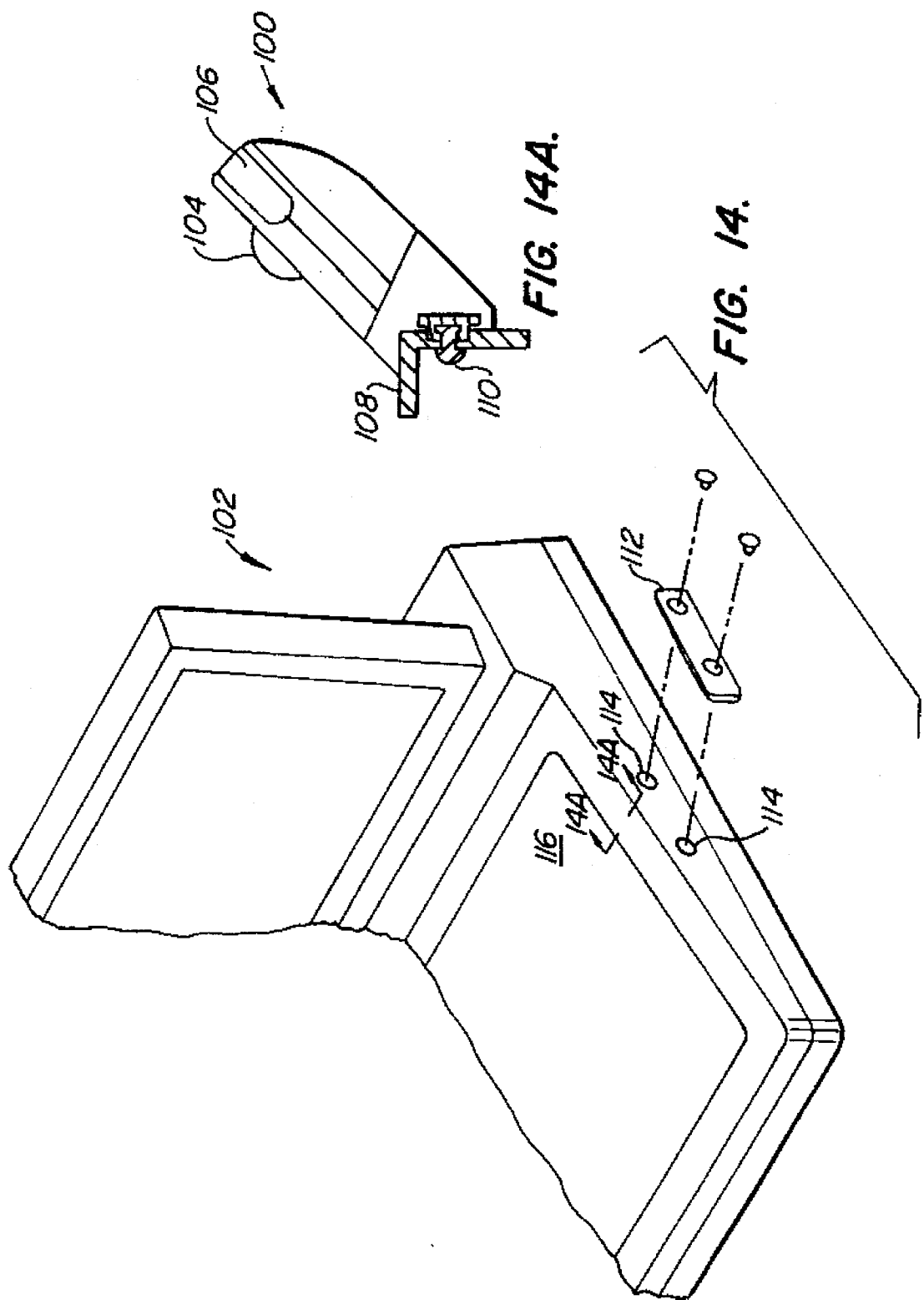

TRACK BALL MOUNTED ON KEYBOARD

This is a continuation of application Ser. No. 07/859,271, filed Mar. 25, 1992, now abandoned, which is a continuation-in-part of patent application Ser. No. 7/681,210, filed Apr. 5, 1991, now abandoned.

BACKGROUND OF THE INVENTION

The present invention relates to a control device for the movement of a visual cursor on a monitor.

Typically, such a control device is called and electronic mouse or a track ball. An electronic mouse is usually moved over a surface on a rolling ball with the cursor tracking the movements of the mouse. A track ball, on the other hand, is typically stationary, with the cursor tracking the movement of the track ball in its housing.

The movement of the ball is typically monitored by the use of two shafts which are spring loaded against the ball and rotate when the ball is rotated, to give rotational movements along two different axes of rotation of the ball. Each of the shafts will have an encoder wheel connected to it.

With the development of laptop computers, it is desirable to have a track ball, since it is not often possible to have a separate surface for using a mouse, such as on an airplane. Since the track ball is stationary, it is ideally suited for such uses. It is desirable to mount a track ball on the keyboard for the computer.

SUMMARY OF THE INVENTION

The present invention provides an improved track ball which can be conveniently manipulated with a single hand. The track ball protrudes through a circular opening in a housing, with the top edge of the housing having a rounded switch. The switch can thus be manipulated with the fingers while the palm or thumb of the hand is manipulating the track ball. The housing is mounted at an adjustable angle to the side of a computer keyboard, providing for easy access. The backside of the housing is rounded, so that it matches the contour of a person's hand whose thumb is on the track ball. A mounting assembly allows the track ball housing to not only be rotated up and down, but to be rotated sideways as well, allowing the user to adjust it to the optimum angle. The track ball can be set at any user-selectable orientation, and is not limited to preset angles. Two degrees of rotation are provided to allow this.

The invention provides a housing for supporting the track ball including a mechanism for holding a track ball, while allowing it to rotate, so as to permit the track ball housing to be used in any orientation, not just horizontal where gravity helps to hold it in place.

This is accomplished in one embodiment using four point supports arranged in a tetrahedron. This configuration allows the sphere to be accurately fixed in space with a minimum amount of drag. Preferably, at least one of the points is spring loaded against the sphere. This configuration will hold the track ball accurately in place no matter what angle it is adjusted to while attached to the keyboard.

Another embodiment uses a ring mounted in the opening holding the track ball, with a number of ball bearings or pins. The ball bearings are held in place on the other side by a spring which biases them against the track ball. Alternately, a compressible foam ring may be mounted in the opening to support the track ball and also allow it to rotate by having a substantially friction free surface.

The track ball of this invention is also optimized for both right and left handed users. A right handed user will want to attach the track ball to the right side of the keyboard, while a left handed user will want to attach it to the left side.

The switch on the top rounded edge is at the rear of the track ball, and thus it will be in the wrong position if it is mounted on the left side but designed for the right side. The present invention provides a reversible switch. Microswitches are included in the housing on both sides beneath cavities in the top of the housing. A rounded switch depression piece can be reversed so that a downward protruding member can be placed in one cavity or the other depending upon which side of the keyboard is used. The design allows the opposite end of the member to be clipped into the non-used cavity, while the other end of the member is used to depress the switch. Thus, depending on the configuration, only one microswitch is actually used.

The present invention further provides an improved encoder wheel which is attached by a shaft to a rotating track ball. The encoder wheel has a number of slots extending from its center to its edge. The slots are rectangular in shape, and do not have edges along radial lines as in the prior art encoder wheels. The slots are also arranged so that each rectangular slot will become horizontal at a position near the bottom of the encoder wheel, rather than in the horizontal plane of the axis of the wheel. This allows the light source and detector to be mounted at the bottom of the encoder wheel, eliminating the need for legs to support the photo emitter and detector and allowing more precise alignment.

For a fuller understanding of the nature and advantages of the invention, reference should be made to the ensuing detailed description taken in conjunction with the accompanying drawings.

BRIEF DESCRIPTION OF THE DRAWINGS

FIG. 11 is a diagram of the right and left-handed switch activation of the invention;

FIGS. 12A and 12B are diagrams of one embodiment of the ball retaining mechanism for 360° mounting using spring-loaded pins;

FIGS. 14, 14A, 15, 15A, 16 and 16A show alternatives to the attachment mechanism of FIG. 1.

DESCRIPTION OF THE PREFERRED EMBODIMENT

Figure 1:
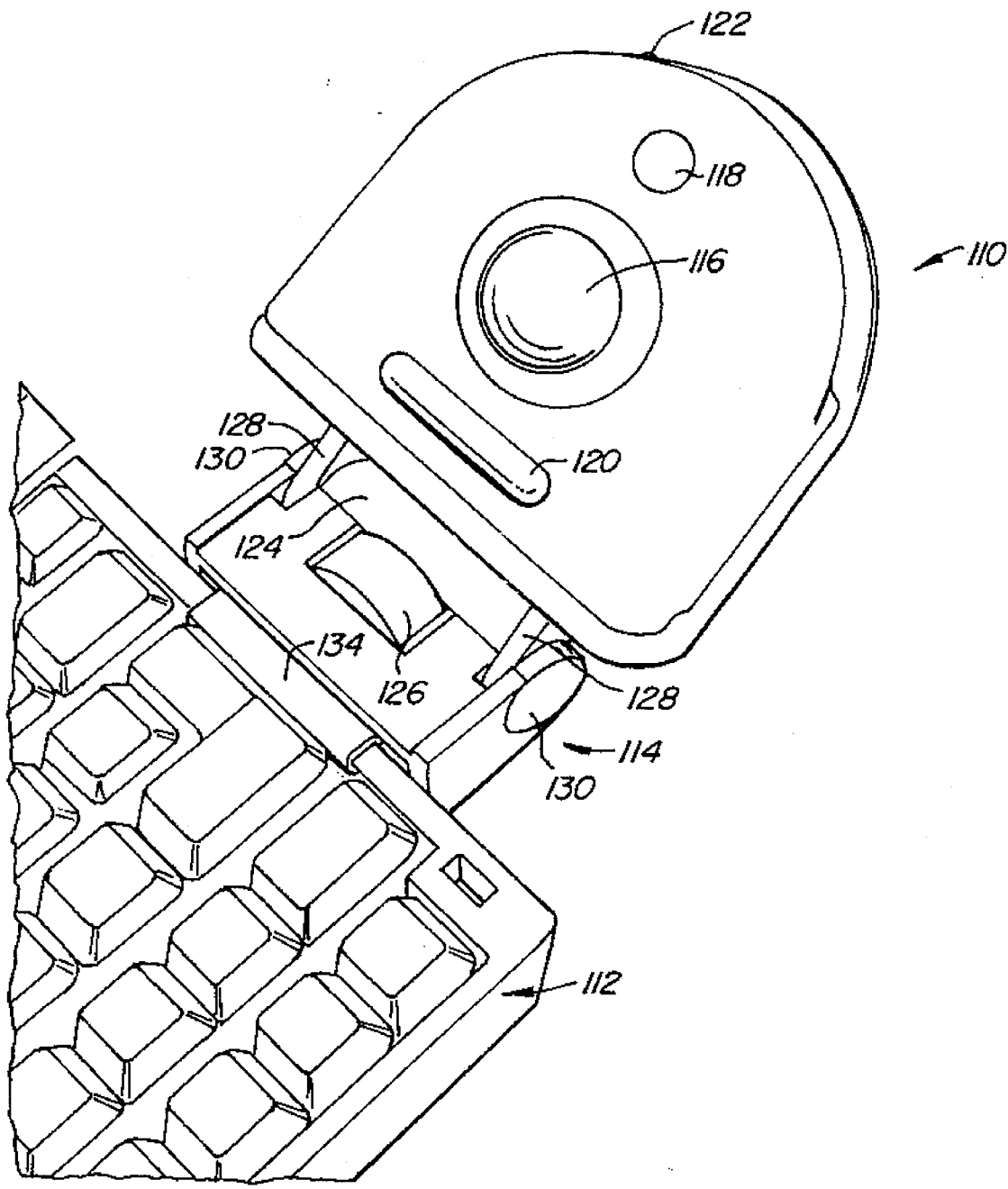
FIG. 1 is a prospective view of a track ball according to the present invention attached to a computer keyboard.

FIG. 1 shows a track ball 110 according to the present invention attached to a keyboard 112 by a mounting assembly 114. A track ball 116 protrudes through an opening in the track ball housing. A pair of switches 118 and 120 are found on the face of the housing. A third switch 122 is located on the circular top of the housing at the far side from the front of the keyboard. This switch is positioned so that a forefinger can operate it while a thumb is operating track ball 116.

Mounting Assembly

Track ball assembly 110 is connected to mounting 114 through two extending legs of a yoke 128. These rotate around an axle connected to end caps 130. This allows for up and down rotation. As can be seen from FIG. 2, rotation toward and away from the user can be accomplished by tilting the track ball housing 110 around a hub 132 of yoke 128. Rotation in both directions requires a slight force to overcome tension provided by O-rings around the axles of rotation. When a rotating tension is released, the track ball assembly will stay in the position to which it is rotated, allowing the user to rotate it to any continuous desired location with two degrees of rotation.

A clamp 134 attaches over the edge of a keyboard 112 as shown in FIG. 1. Clamp 134 is preferably insertable through an opening 136 in a chassis 140 (see FIG. 2) where it will mate with an opposing member to secure it. The design allows for easy insertion and also provides a breakaway safety function. The breakaway function causes separation of the clamp from the keyboard when the track ball assembly is bumped with a vertical force.

A thumbwheel 126 is used to rotate a screw attached to a moving assembly 142 (see FIG. 3A) coupled to clamp 134 to allow adjustment to the clamp for connecting over the edge of different sized keyboards and for securing it to the keyboard.

Figure 2:
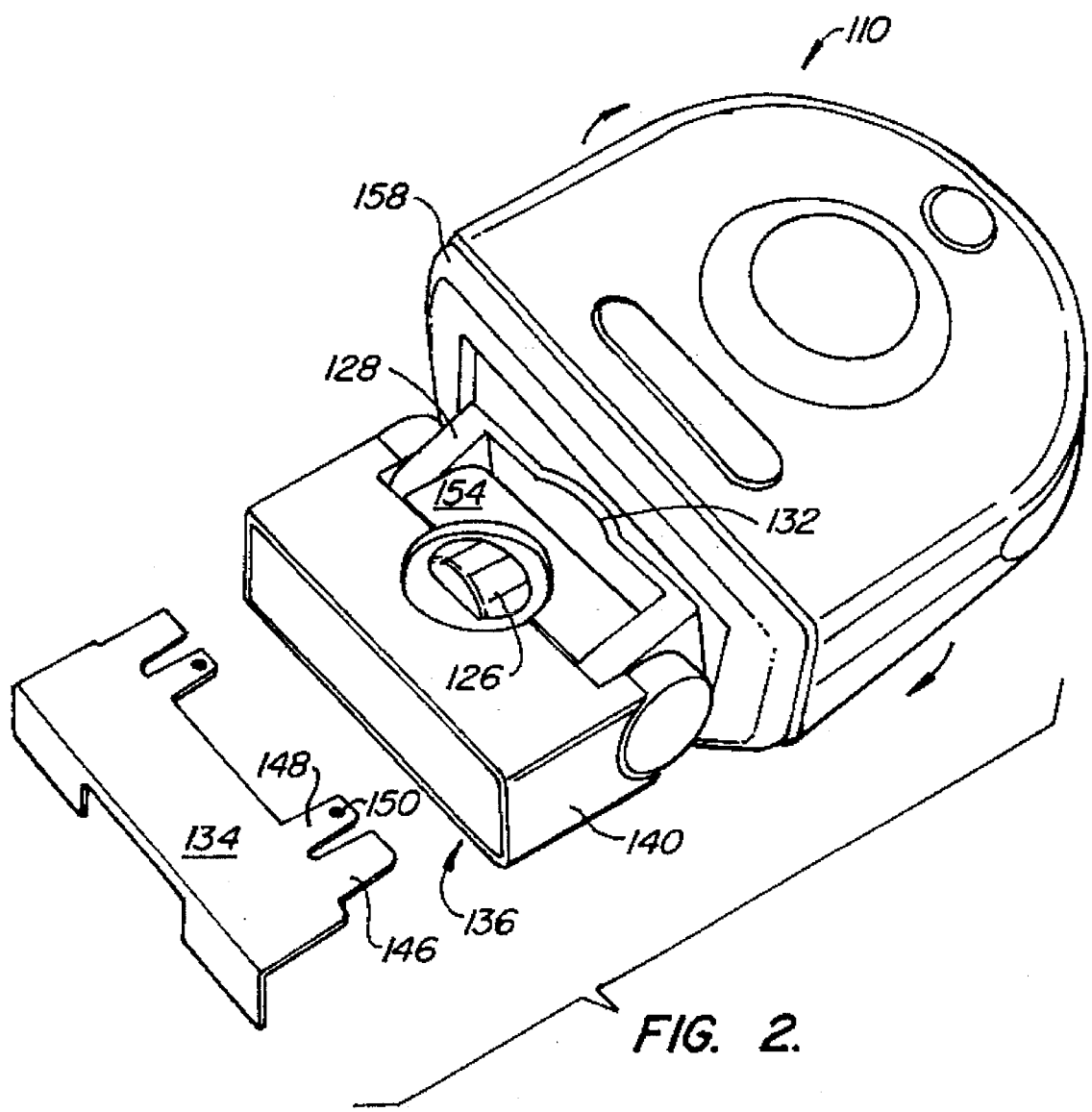
FIG. 2 is a perspective view of the track ball of FIG. 1 with the track ball rotated downward and sideways.
Figure 3A:
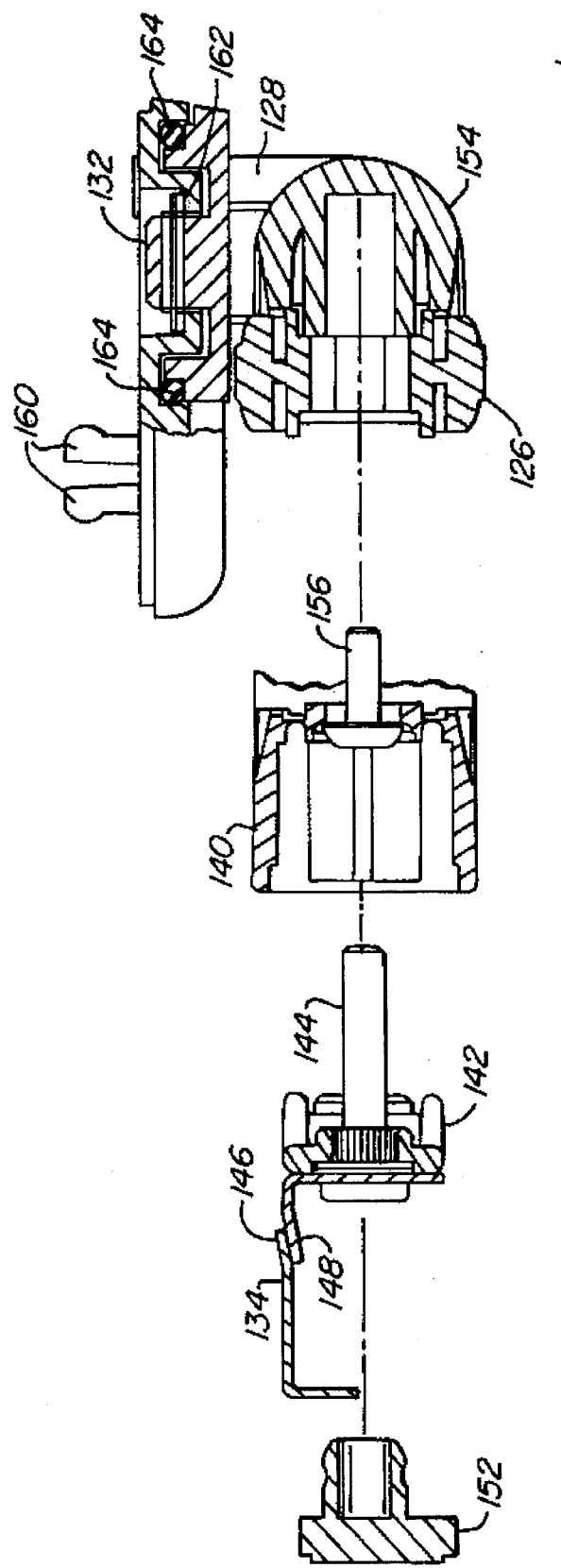
FIGS. 3A–3D are exploded and different sided, broken-away views of the mounting assembly of FIG. 1.

The operation of thumbwheel 126 is seen more clearly in the exploded, sectional view of FIG. 3A. Thumbwheel 126 will cause rotation of screw 144 when the assembly of FIG. 3A is assembled. Screw 144 will move assembly 142 forward or backward as the thumbwheel is moved. Clamp 134 is shown with a tab 146 (see FIG. 2 also) press-fitted over a corresponding tab 148 in assembly 142. Obscured from view is the other tab 148 shown in FIG. 2 which is pressed below a corresponding tab on mechanism 142, with the juxtaposed tabs providing the mating function. A dimple 150 on tab 148 mates with a corresponding depression in the tab of assembly 142 to provide a securing function. This will secure the mechanism during normal operation, but also allows easy replacement of clamp 134 without requiring use of the thumbwheel to bring assembly 142 out of opening 136. In addition, this provides a breakaway function, with tab 148 separating from the chassis 140 if excessive force is applied to the track ball mechanism. Dimple 150 will separate if sufficient force is applied.

A rubber bumper 152 will be provided on the face of assembly 142 opposite clamp 134 to provide a cushioning against the side of the keyboard when the clamp is tightened to attach the track ball mechanism to the side of the keyboard.

Assembly 142 moves back and forth within chassis 140 as can be seen in FIG. 3A. Chassis 140 is connected to a nose section 154 (see also FIG. 2) by a screw 156. Screw 156 is off to the side of centrally placed thumbwheel 126, as can be seen better in the view of FIG. 3B.

As can be seen in FIG. 3A, yoke 128 includes a central hub 132 which extends through the bottom of a platform 158 upon which the track ball housing 110 is mounted. The track ball housing is mounted on the platform 158 with cylindrical holes in the bottom of housing 110 which mate with plastic stubs 160 on the top of platform 158.

Hub 132 is held in place with a washer 162 which has upward serrated edges to hold it in place against hub 132. This thus holds yoke 128 compressed against platform 154. An O-ring 164 is provided in a gap between yoke 128 and platform 158 and is compressed by the assembly of the washer 162 over hub 132. This compression is sufficient to hold the track ball housing at a desired orientation when rotated, while at the same time allowing rotation with only a slight amount of force to overcome the friction of the compressed O-ring.

Figure 3D:
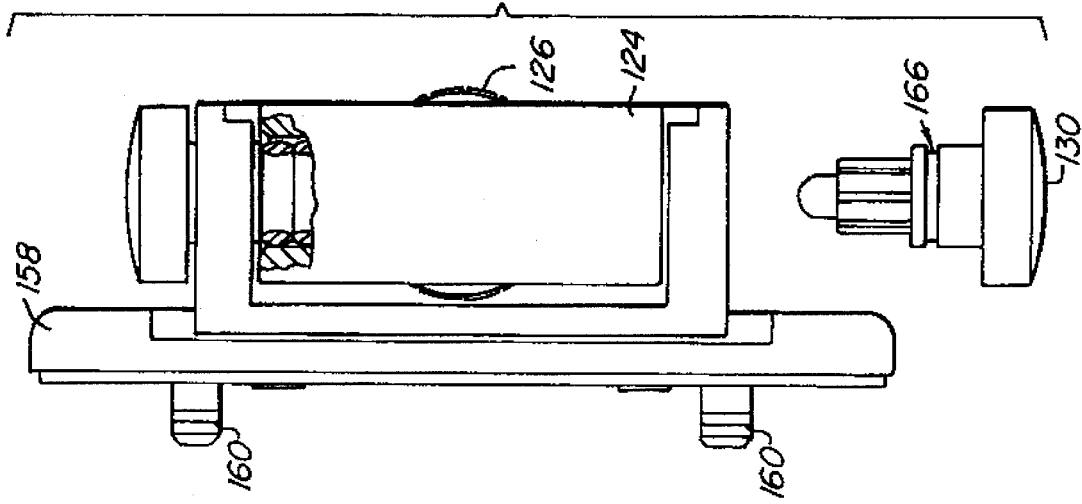
Figure 3C:
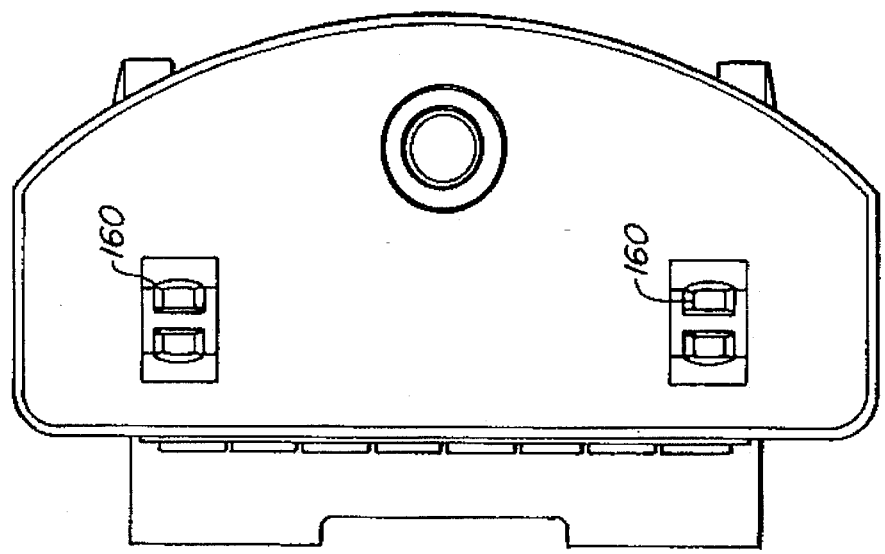
Figure 3B:
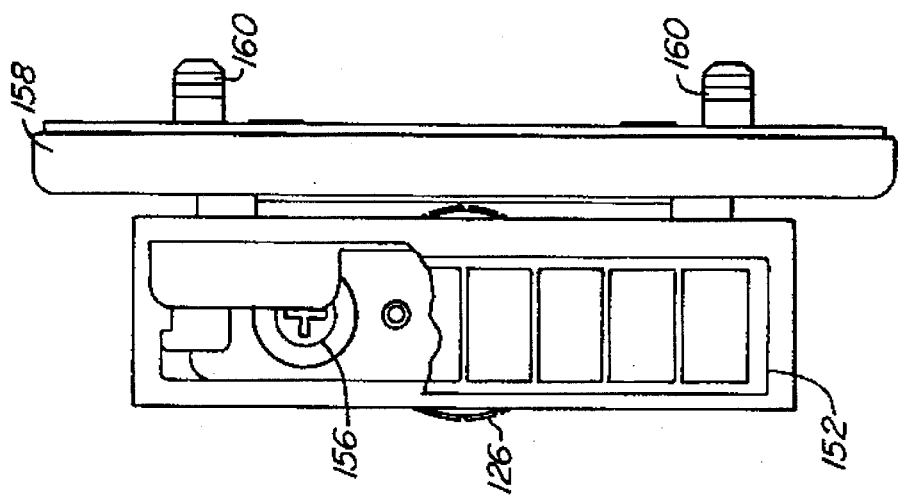

A similar O-ring is placed around the hub of an end cap 130 as shown in FIG. 3D to provide a similar rotational function. Cap 130 press-fits into nose 124 until a recess 166 in end cap 130 engages a corresponding protrusion inside of nose 124.

FIGS. 14, 14A, 15, 15A, 16 and 16A show alternate embodiments of the attachment mechanism. FIG. 14 and 14A show an exploded view of a track ball housing 100 connected to a computer 102. A track ball 104 extends through an opening in the housing. A curved switch 106 is positioned on a top, curved end of the housing. The bottom end of the housing is connected to a bracket 108 which includes a pair of locking plugs 110. Locking plugs 110 fit through a snap-on adapter 112 to hook into holes 114 in the side of computer 102 adjacent to keyboard 116. As can be seen, the track ball mechanism is mounted by the bracket at an angle of approximately 45 degree to the keyboard 116. This allows easy access by the user.

Alternately, the track ball could be mounted on the left side of the computer keyboard for a left-handed user. Track ball 104 is positioned close enough to switch 106 so that the user can manipulate switch 106 at the same time as moving track ball 104 with a single hand. The other hand is then free to be operating the keys on the keyboard of computer 102.

Figure 15A:
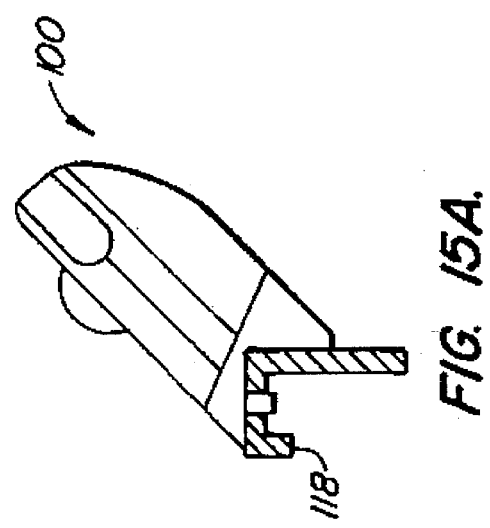
Figure 15:
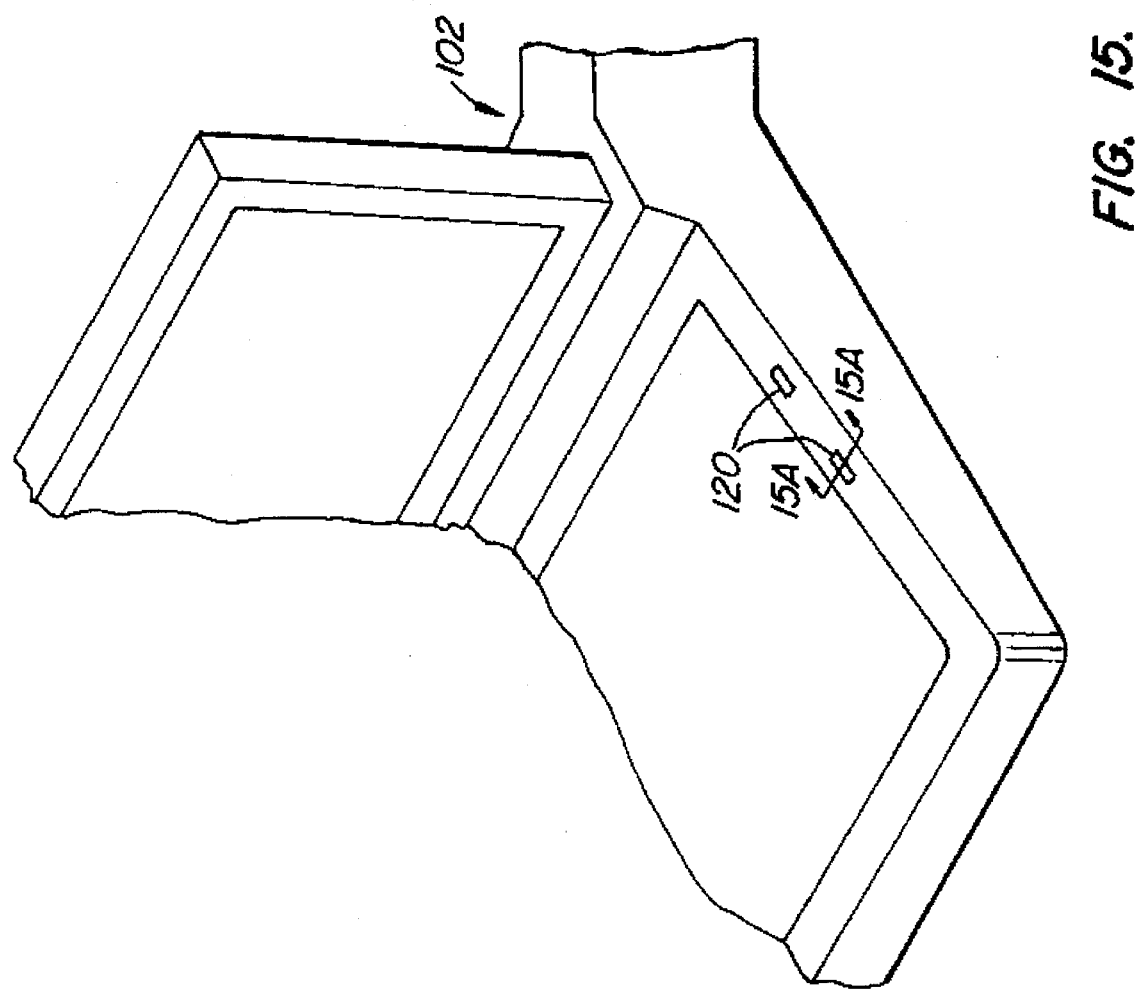
Figure 16A:
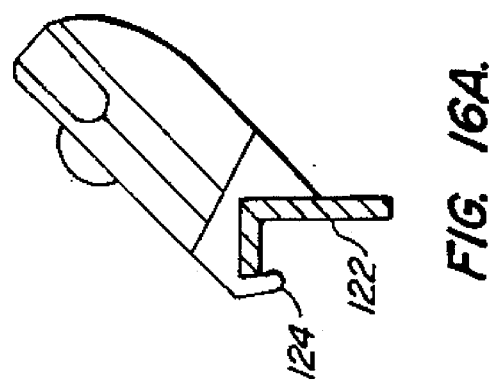
Figure 16:
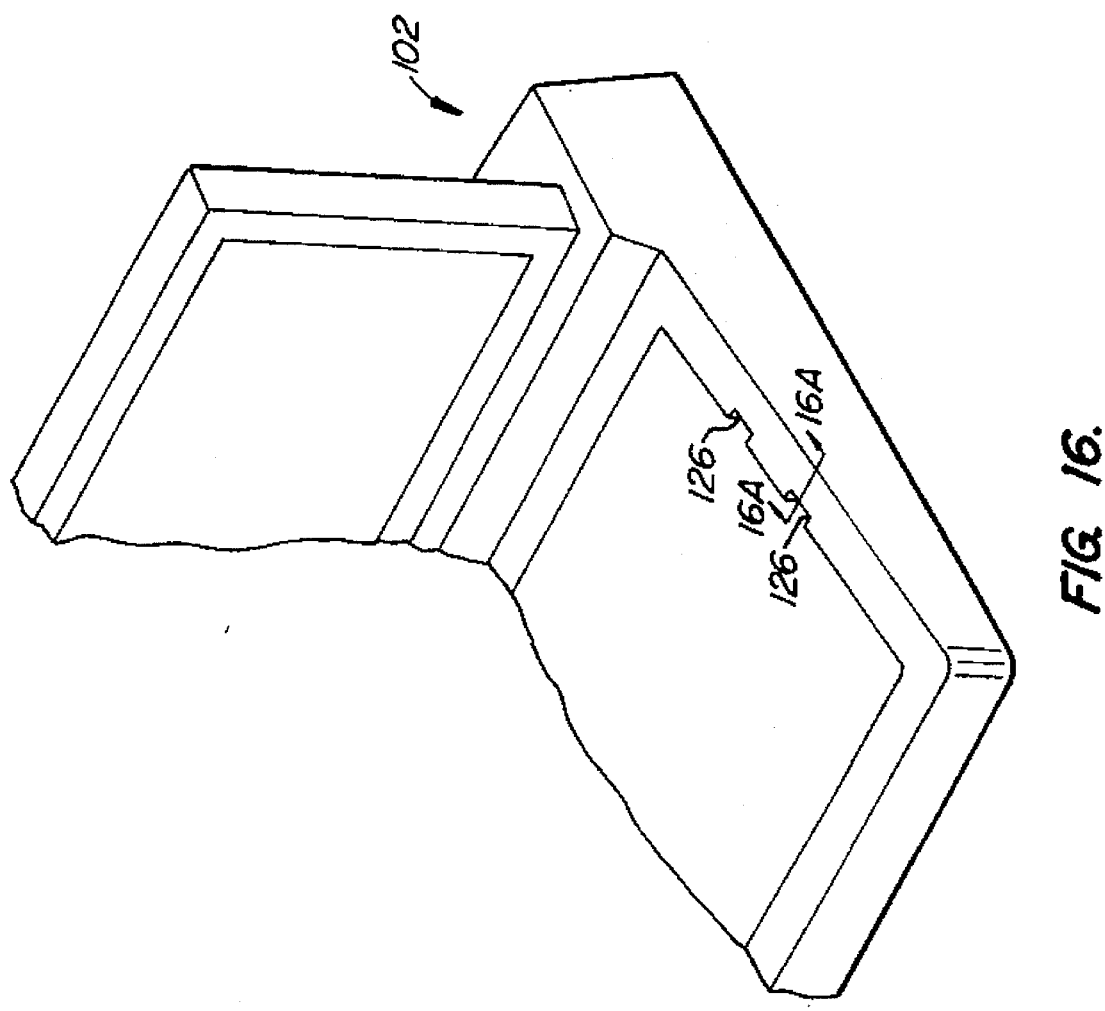

FIGS. 15 and 15A show a second embodiment of the bracket for the housing of FIG. 2. Here, a pair of downwardly extending members 118 hook into slots 120 in computer 102. FIGS. 16 and 16A show yet another embodiment in which a bracket 122 has downward and inwardly extending members 124 which hook into notches 126 of computer 102.

Encoder Wheel

Figure 4:
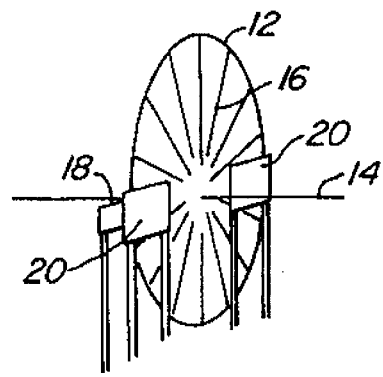
FIG. 4 is a perspective view of an encoder wheel according to the prior art.
Figure 5:
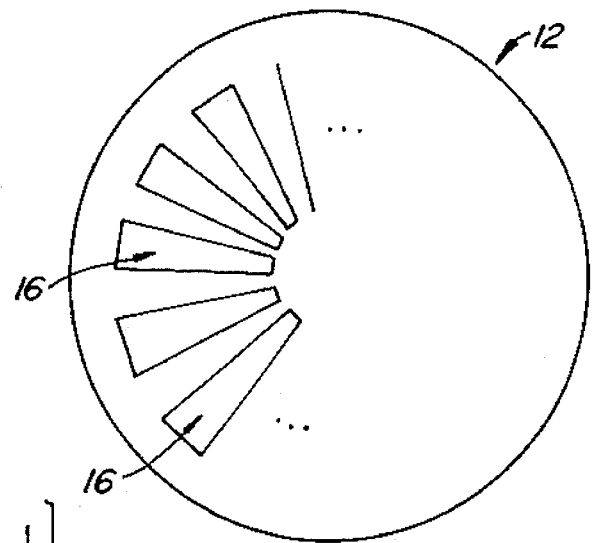
FIG. 5 is a top view of the encoder wheel of FIG. 1 showing the arrangement of the slots.

An example of a prior art encoder wheel system is shown in FIG. 4 with an encoder wheel 12 connected to a shaft 14 which is in turn biased against the ball (not shown). The encoder wheel has a number of slots 16 which can be seen more clearly in the view of the encoder wheel shown in FIG. 5. On each side of the encoder wheel is a light emitting device 18, only one of which can be seen in the view of FIG. 4. Opposite the light emitting device are photodetectors 20. Each photodetector will receive a light signal, as the wheel is rotated, each time a slot passes between the light detector and the light emitter. In this way, the movement of the track ball can be monitored using electric pulses generated by the photodetectors.

Figure 6:
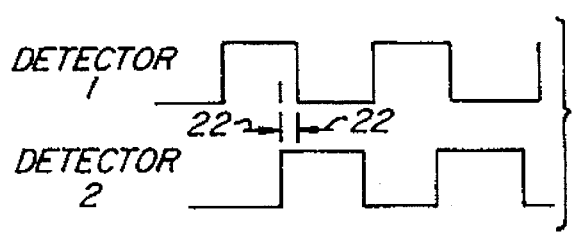
FIG. 6 is a diagram illustrating the duty cycle and phase shift of the signal from the detectors of FIG. 1.

Typically, the detectors are arranged to produce signals as shown in FIG. 6. The size of the slots is chosen to give a duty cycle of the signal (its on and off time) of 50%. Similarly, the photo detector devices are arranged such that the phase shift between the two detector signals, indicated by arrows 22, is approximately 20%.

Figure 7:
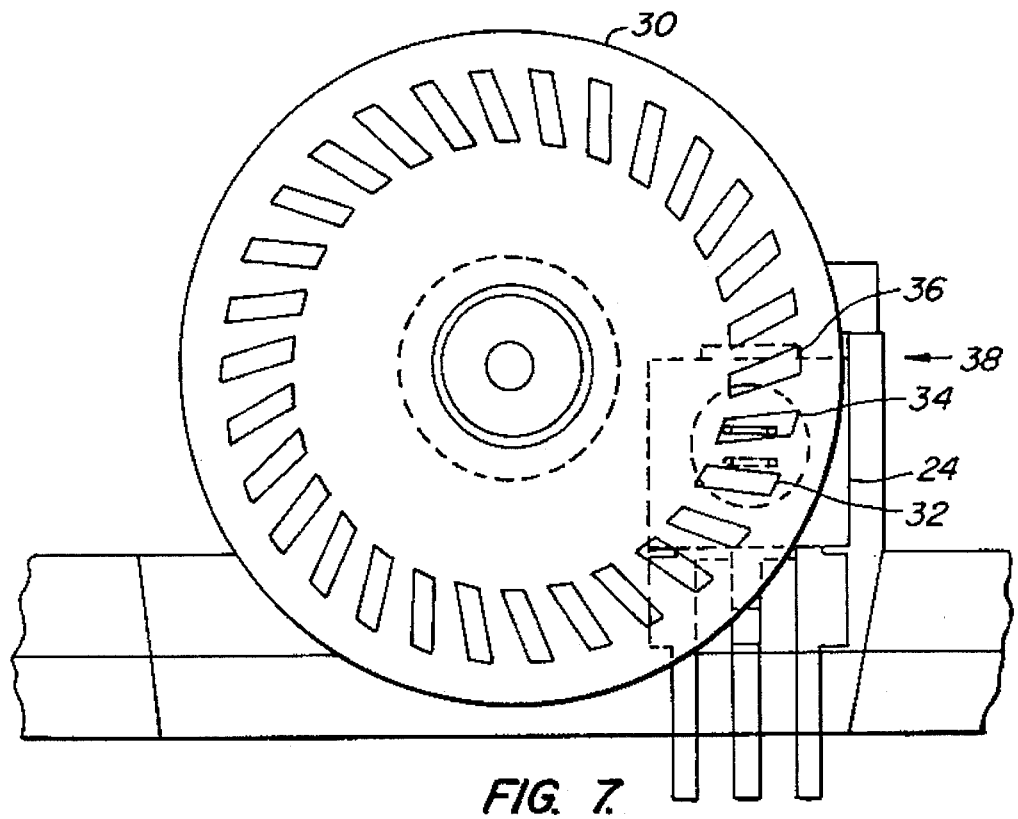
FIG. 7 is a top view of an encoder wheel according to the present invention.

FIG. 7 shows an encoder wheel 30 according to the present invention. The wheel has a number of rectangular slots 32, 34, 36, etc. Each slot is rectangular in shape, rather than having radially diverging sides, as in the slots of FIG. 2. The slots are arranged so that they become horizontal at the position of slot 34 shown in FIG. 7. As can be seen, this is much lower on the encoder wheel than a position 38 which is in a horizontal plane passing through the encoder wheel axis. This allows the photoemitter and photodetector to be mounted lower, at the position of slot 34, rather than being at position 38 as in the prior art. As the encoder wheel rotates, the next slot 34 will also become horizontal at the current position of slot 34.

A detector 24 is used which eliminates the need for two physical detector chips by employing two rectangular photodetectors on a single chip. The single detector chip 24 has two photodetectors 26.

Figure 8:
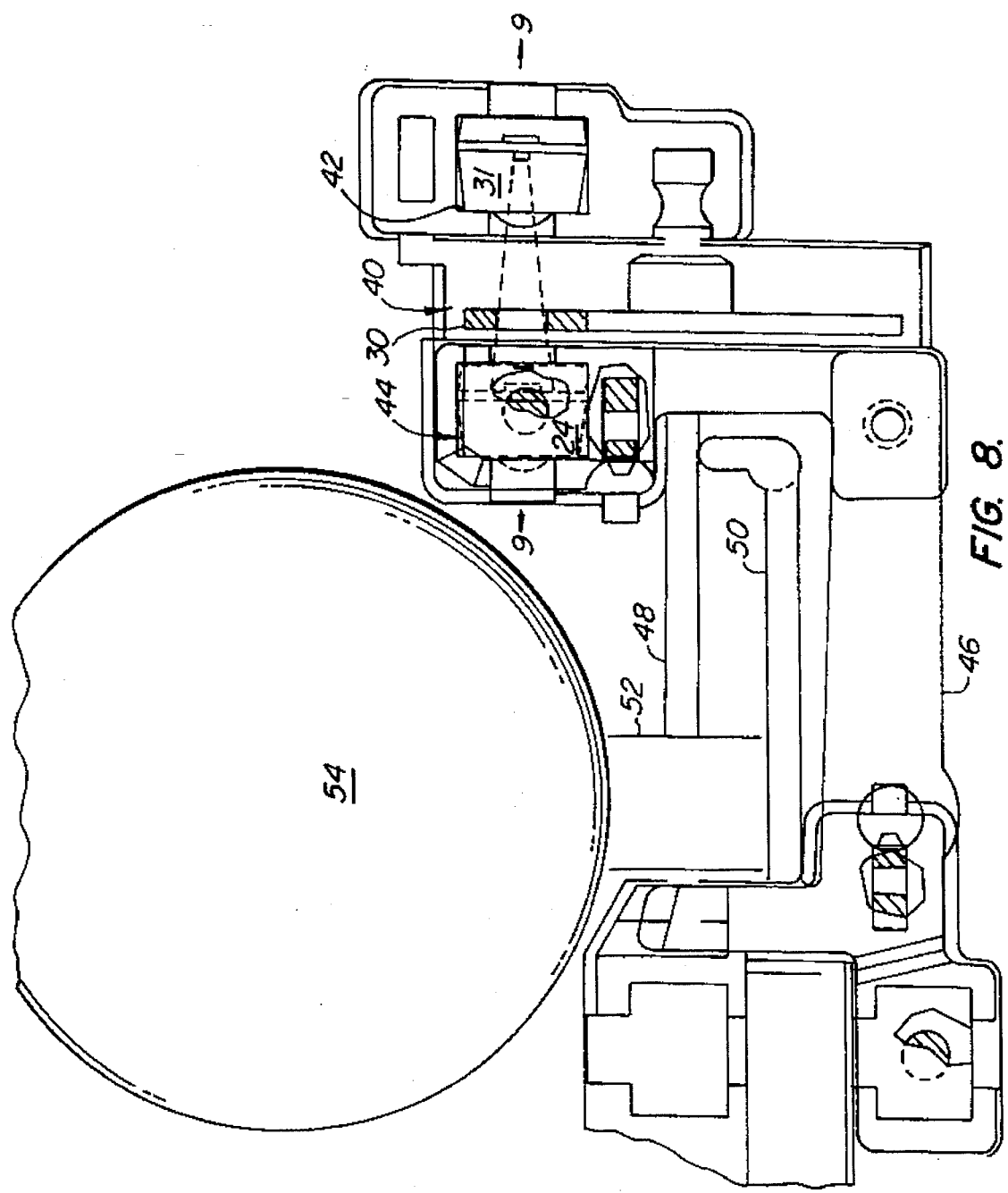
FIG. 8 is a diagram of the portion of the housing holding the photo emitter and detector.

This allows the photoemitter and detector to be mounted lower in the housing as shown in FIG. 8. FIG. 8 is a top view of a portion of the housing showing a slot 40 for the encoder wheel 30 to extend partially into. A first cavity 42 is formed for placement of the photoemitter 31, and a second cavity 44 is formed for placement of the photodetector 24. Thus, the photoemitter and detector can be simply inserted in the cavity, without having to be mounted on legs at a higher position.

FIG. 8 also shows a plastic member 46 which holds down a shaft 48 at two positions. The shaft 48 connects to encoder wheel 30 which partially extends into slot 40. The top portion of member 46 covers up cavity 44 holding the photodetector. Member 46 includes a plastic spring 50 which is biased against shaft 48. This forces a roller 52 at the end of shaft 48 against the track ball 54. This simplifies the construction and lowers the cost of the track ball mechanism by eliminating the need for wire coil springs as used in the prior art. The plastic housing serves multiple purposes. First, it provides a spring for biasing the shaft against the track ball. Second, it holds the shaft in place. Third, it covers photoemitter 44, preventing ambient light from interfering with the detection mechanism.

Figure 9:
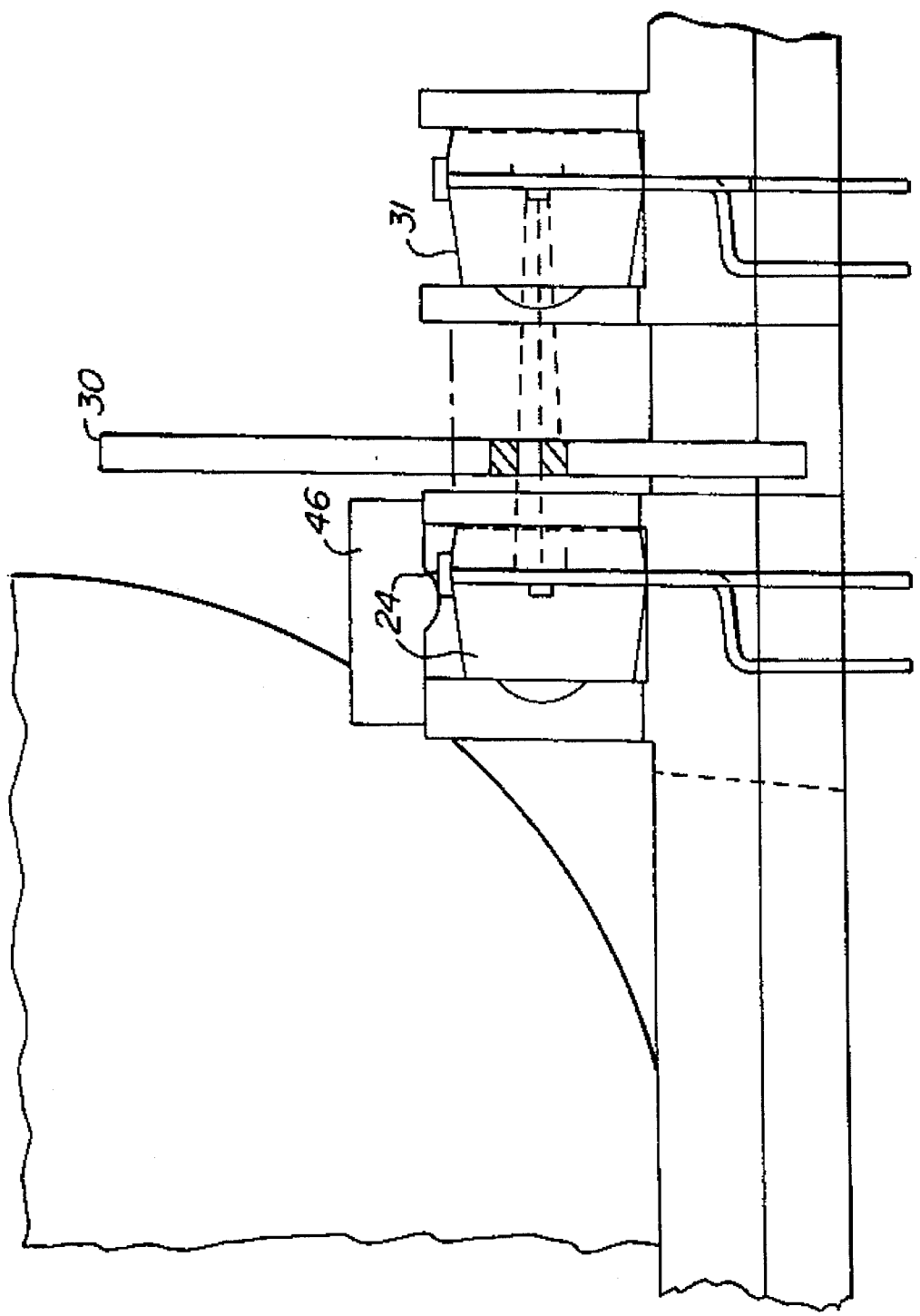
FIG. 9 is a side view along lines 9—9 of FIG. 8.

FIG. 9 is a view of FIG. 8 along lines 9—9. A slot of the encoder wheel 30 passing between photoemitter 31 and photodetector 24 can be seen. The portion of plastic member 46 covering photodetector 24 is also shown.

The encoder wheel of FIG. 7 is preferably used with a dual parallel detector 24. By using a rectangular shape for the slots, the need for a mask is eliminated. When in the horizontal position of slot 34, the slot will be exactly between the two photodetectors 26. As can be seen, the inner end of the next slot will come in contact with the top photodetector first as the wheel rotates. This will vary the duty cycle of the signal detected. By moving the photodetector to one side or another, the duty cycle can be altered to make it optimum while the phase shift remains the same. This makes the designing of the housing for holding the photoemitter and detector much simpler.

Ball-Retaining Mechanism

Figure 10A:
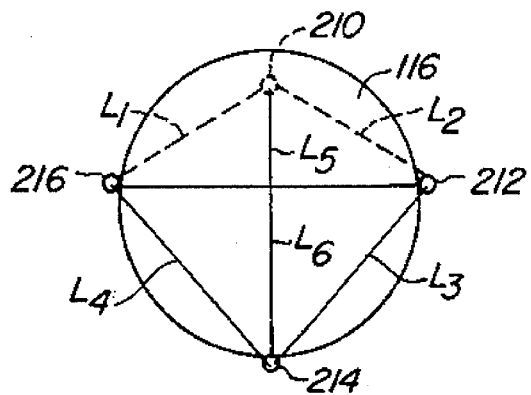
FIGS. 10A–D are diagrams of a ball retaining mechanism for 360° mounting according to the present invention.

FIGS. 10A–10D illustrate one embodiment of the ball retaining mechanism of the present invention. FIG. 10A illustrates a tetrahedron formed between 4 retaining points 210, 212, 214 and 216. The distance between any one of these points and another one of the points, indicated as L1–L6, are equal. Thus, the force is equally distributed and the track ball is securely held. When the track ball 116 is arranged so that one of the retaining points is directly beneath it, the other three points will be in a plane above it. The three points in a plane allow access to the sphere's surface for a track ball operation through the opening in the track ball housing.

Figure 10B:
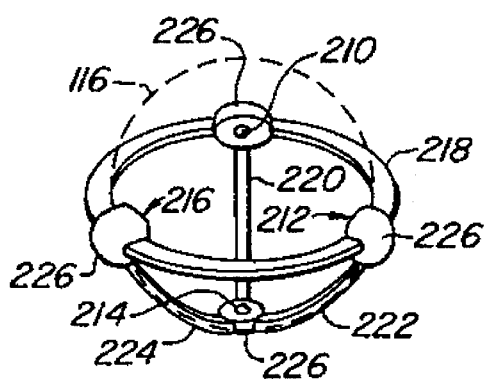

FIG. 10B illustrates one way of constraining the contact points. In this embodiment, the contact points 210–216 are small, hard balls. Preferably, they are made of a jewel, such as ruby stone. By making the contact points harder than the track ball itself, wear of the contact points is avoided while maintaining a precise point of contact which will not be changed over time by wear.

The mechanism of FIG. 10B shows a cage or link structure which can be assembled about the ball to hold the retaining contacts. The cage could be one semi-flexible molded piece or assembled from multiple parts. The cage includes a top spherical section 218 and three legs 220, 222 and 224 extending to the bottom retaining point 214. Each of the retaining points is embedded in a shell 226. Shells 226 can either hold the retaining points in a fixed position, or allow them to rotate within a cavity within the shell. Preferably, at least one of the retaining points is spring biased to force it against the track ball.

Figure 10C:
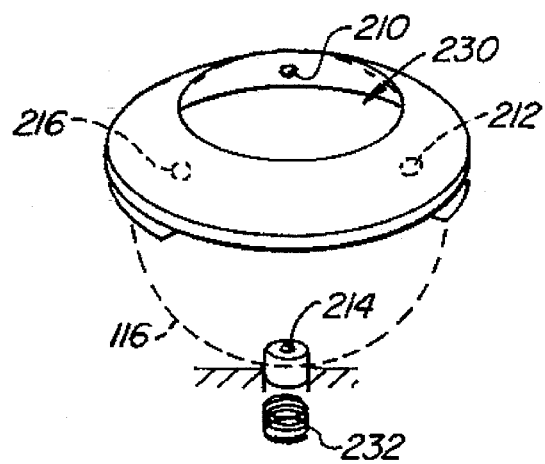

FIG. 10C shows an alternate embodiment in which a retaining ring 230 is used to hold the top three retaining balls 210, 212 and 216. The bottom retaining ball 214 is spring biased against track ball 116 by a spring 232.

Different variations of the structure shown in FIG. 10–10C could be used. For instance, one or more of the retaining points could be spring loaded. Alternately, one or more of the retaining points could be allowed to rotate within its cavity. In yet another embodiment, the bottom retaining point could be larger than the other points to handle the greater pressure it will be subjected to.

As can be seen, this system does not rely on gravity to maintain the track ball in a fixed location, as in many prior art track balls. Therefore, the track ball can be mounted at any angle the user desires.

Figure 10D:
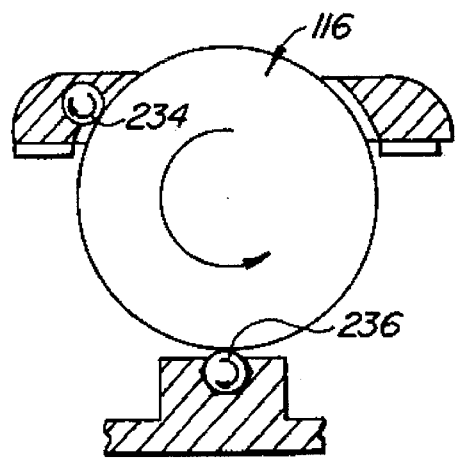

FIG. 10D illustrates track ball 116 and two of the retaining points 234 and 236, which are shown as rotating balls within a cavity in this embodiment. In addition to the support balls, encoder rollers will be biased against the track ball in the method well known in the prior art. With the spring retaining mechanism of FIGS. 10A–10D, the track ball can be mounted at the angle shown in FIG. 1 without detracting from its performance.

FIG. 12A shows another embodiment of the opening through which track ball 54 will extend to be contacted by the user. The opening has a ring shape with a number of pins 56 extending through openings in the ring. These pins are held in place by a spring 58. The spring ensures that the pins will be in constant contact with the track ball 54, even when the housing is turned sideways or upside down. This allows use of the track ball in any orientation through 360°. Many prior art track balls simply rely on gravity to maintain the track ball in contact with the encoder wheels.

FIG. 12B shows a sectional, side view of a pin 56. The spring 58 lies in a groove 57 in the backside of pin 56, biasing the pin against the ball. Alternately, a ball bearing could be mounted in an enclosure with a slot in the back for the spring.

Figure 13:
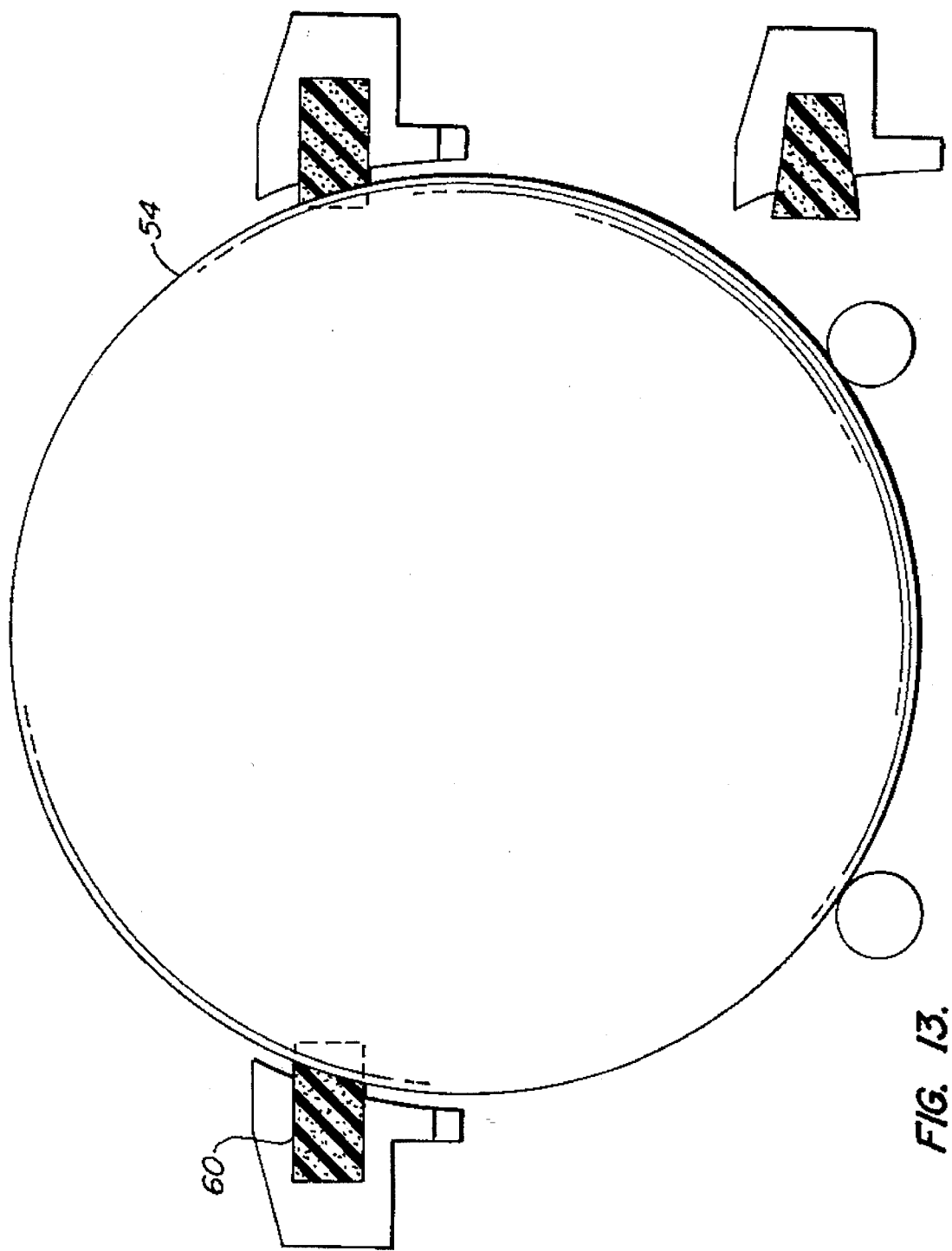
FIG. 13 is an alternative embodiment to that shown in FIG. 12A using a compressible foam ring.

FIG. 13 shows an alternative embodiment of the system in FIG. 12A. Instead of ball bearings, a compressible foam ring 60 is mounted in the opening. The ring extends outward and contacts the track ball 54, and is compressed by the track ball to provide the spring action to hold it in place. At the same time, foam ring 60 has a low friction surface, allowing the track ball to easily rotate.

Reversible Switch

In addition to the track ball, a switch is mounted under activator member 122, so that a user can depress it to send a signal to a computer. As can be seen, this mounting is handy for a right-handed person but awkward for a left-handed person. It is desirable to be able to mount the track ball mechanism on the left side of the keyboard, but this will require a different mechanism with the switch on the other side in order to have it operating in the same manner.

The present invention provides a mechanism for overcoming this as shown in FIG. 11. A cutaway view of the housing, with the top switch activating member removed is shown in FIG. 11. Housing 250 has a rounded top edge with a pair of cavities 252 and 254. Inside the housing is a circuit board 256. A pair of microswitches 258 and 260 are mounted on circuit board 256 beneath the cavities 254 and 252, respectively. Activating member 262 has a pair of downward extending, hooked members 264. Members 264 will engage the edges of cavity 256 as illustrated by the dotted lines. Another hook member 266 on the other side of member 262 will engage the edge of cavity 254. This will hold the activating member 262 in place, with a protrusion 268 causing the side of the member with downward projection 270 to be slightly lifted. Projection 270 will engage microswitch 258 when pressed downward with the pressure of a user's fingers.

Microswitches 258 and 260 are electrically connected is parallel so activation of either one will send the desired signal. In the configuration shown in FIG. 11, microswitch 260 is simply not used. This is a configuration for a right-handed user. If a left-handed user desires to attach the track ball to the left side of the keyboard instead, activating member 262 is simply reversed. As can be seen, in the reversed position, hook members 264 will engage the edges of cavity 254, not cavity 252. Projection 270 will then activate microswitch 260 when depressed.

Thus, as can be seen, the same structure can be used for both right and left handed users. The present invention thus provides a track ball which can be mounted at any angle and can be used on both the right and left hand sides of the keyboard with the track ball being held in position at whatever angle the user adjusts the track ball to.

Breakaway Mechanism

Figure 17:
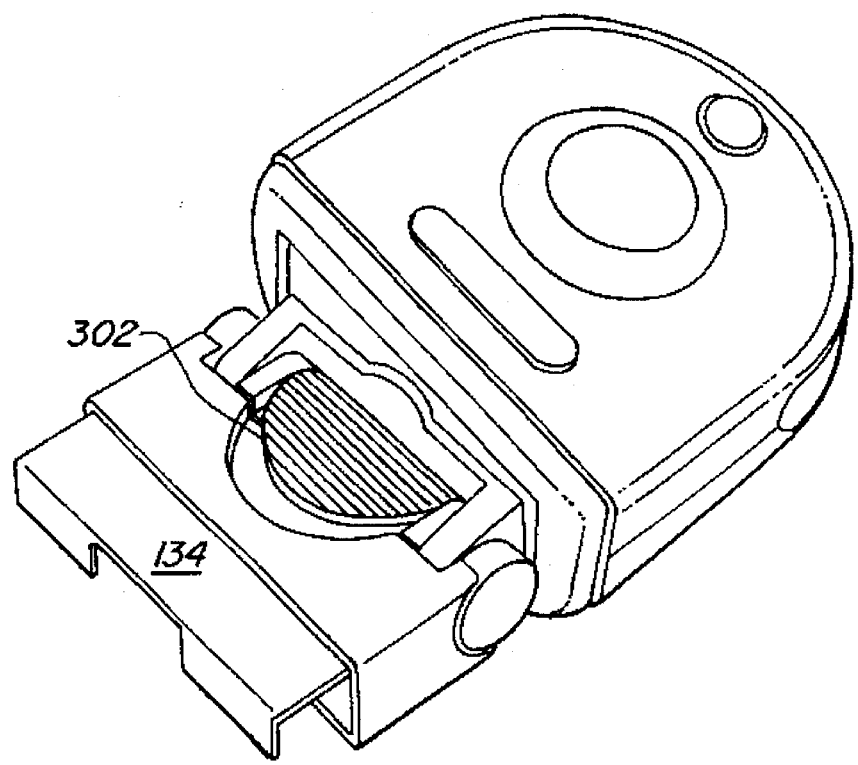
FIGS. 17 and 18 are perspective views showing a breakaway feature.
Figure 18:
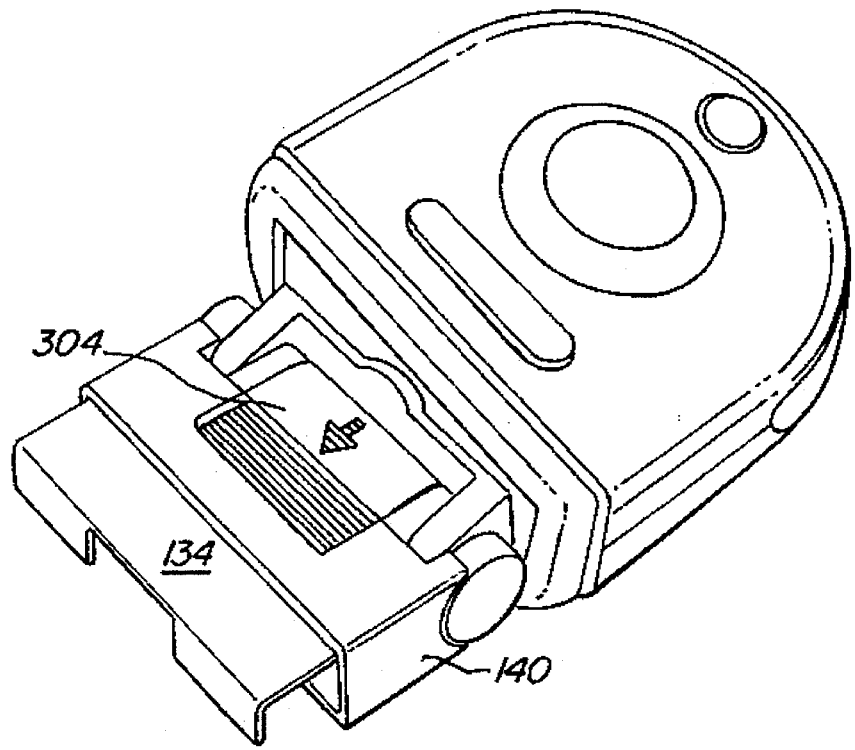

FIGS. 17 and 18 show different embodiments of a breakaway mechanism for the present invention. Since the track ball will typically be mounted on the edge of a computer, such as on the edge of a keyboard, it will stick out and be a likely target for getting bumped. Accordingly, it is desirable to have a release mechanism to allow the track ball to break away from the computer without breaking the keyboard.

This is accomplished in FIG. 17 by elimination of the thumbwheel and the use of a push-button 302 in its place. Depressing button 302 will force clamping blade 134 outward through the use of a internal spring-loaded mechanism. The spring loading, which may be a compressing spring, holds clamp 134 in place. At the same time, the spring provides sufficient play so that when force is applied to the track ball the clamp 134 can come loose, allowing the mechanism to separate from the computer. FIG. 18 shows an alternate mechanism in which a button 304 slides forward, rather than being pushed down, to push clamp 134 outward against the force of the spring. The spring would secure the internal edge of clamp 134 against the inside of chassis 140, with either of the buttons 302 or 304 of FIGS. 17 and 18 exerting a force on the clamping assembly 134 to push it outward, stretching the spring until the clamp is over the keyboard at the desired position. When the button is then released, the spring will pull clamping assembly 134 back to secure the assembly against the side of the keyboard.

Alternate embodiments of a breakaway mechanism could be used. For instance, a leaf spring or compression spring could be used in the embodiments of FIGS. 1 and 2, the springs being between the thumb screw and the clamping assembly 134. The thumb screw would then be used to tighten down the clamping mechanism against the force of the spring, compressing the spring to a desired amount. The spring would still have compression in it, though, to give sufficient play for the breakaway of the clamp upon force being applied to the track ball mechanism.

An additional breakaway mechanism separates clamp 134 from chassis 140 as shown in FIG. 2 and discussed earlier. This will leave clamp 134 attached to the keyboard.

As will be understood by those familiar with the art, the present invention may be embodied in other specific forms without departing from the spirit or essential characteristics thereof. Accordingly, the disclosure of the preferred embodiment of the invention is intended to be illustrative, but not limiting of the scope of the invention which is set forth in the following claims.

What is claimed is:

1. A track ball mechanism for attaching to a computer, comprising:

a track ball housing having an opening with a track ball extending therethrough;

clamping means for attaching to said computer; and rotating means, coupling said track ball housing to said clamping means, for allowing rotation of said track ball housing in a first direction relative to said clamping means, and in a second direction orthogonal to said first direction, said rotating means including means for securing said track ball housing at any one of multiple continuous angles, said means for securing includes a hub coupled to said rotating means and extending into said track ball housing, and an O-ring compressed between said means for rotating and said track ball housing to provide continuous tension which can be overcome by a twisting force applied by a user's hand, thereby permitting said track ball to be arbitrarily repositioned with respect to said means for rotating.

2. The track ball mechanism of claim 1 further comprising a second O-ring compressed between said hub and said track ball housing.

3. The track ball mechanism of claim 1 wherein said rotating means includes a yoke; and a cylindrical member rotatably coupled to said yoke.

4. A track ball mechanism for attaching to a computer, comprising:

a track ball housing having an opening with a track ball extending therethrough;

clamping means for attaching to said computer;

rotating means, coupling said track ball housing to said clamping means, for allowing rotation of said track ball housing relative to said clamping means, said rotating means providing for rotation in two directions, said rotating means comprising:

a first member rotatably coupled to said clamping means to allow rotation in a first direction relative to said clamping means, a second member, rotatably coupled between said first member and said track ball housing, to allow rotation of said track ball housing relative to said clamping means in a second direction orthogonal to said first direction, wherein said clamping means includes a cylindrical member opposite said computer and said second member comprises a yoke having a central hub assembly rotatably attached to said track ball housing, said first member comprises at least one stub extending from said yoke opposite said hub assembly for rotatably coupling to said cylindrical member; and a first O-ring compressed between said central hub and said track ball housing and a second O-ring compressed between said stub and said cylindrical member, said O-rings providing a continuous tension which can be overcome by a force applied by a user's hand.

\* \* \* \* \*